United States Patent [19]
Crampton

[11] 3,762,549
[45] Oct. 2, 1973

[54] THERMOLYTIC SEWAGE SYSTEM
[76] Inventor: Lester M. Crampton, 7240 S.W. 63th Ct., South Miami, Fla.
[22] Filed: July 2, 1971
[21] Appl. No.: 159,240

[52] U.S. Cl.................. 210/123, 210/138, 210/152, 210/180, 210/187
[51] Int. Cl........................ B01d 21/24, B01d 1/22
[58] Field of Search...................... 210/71, 170, 173, 210/187, 177, 180

[56] References Cited
UNITED STATES PATENTS
| | | | |
|---|---|---|---|
| 3,471,020 | 10/1969 | Wallace | 210/152 |
| 3,219,579 | 11/1965 | Kranz | 210/71 X |
| 3,464,917 | 9/1969 | Porteous | 210/71 X |

FOREIGN PATENTS OR APPLICATIONS
| | | | |
|---|---|---|---|
| 603,033 | 8/1960 | Canada | 210/173 |

Primary Examiner—John Adee
Attorney—Berman, Davidson & Berman

[57] ABSTRACT

A system for treating sewage in which the sewage passes a grinder to reduce the solids and then goes into a holding tank under ground. The sewage flows from the holding tank to an evaporator with the products of combustion flowing over water heating coils and under the holding tank to heat the sewage water and to preheat the holding tank. Condensate from the products of combustion flows to a holding tank and from there into the ground with the gaseous material passing off through a stack.

10 Claims, 11 Drawing Figures

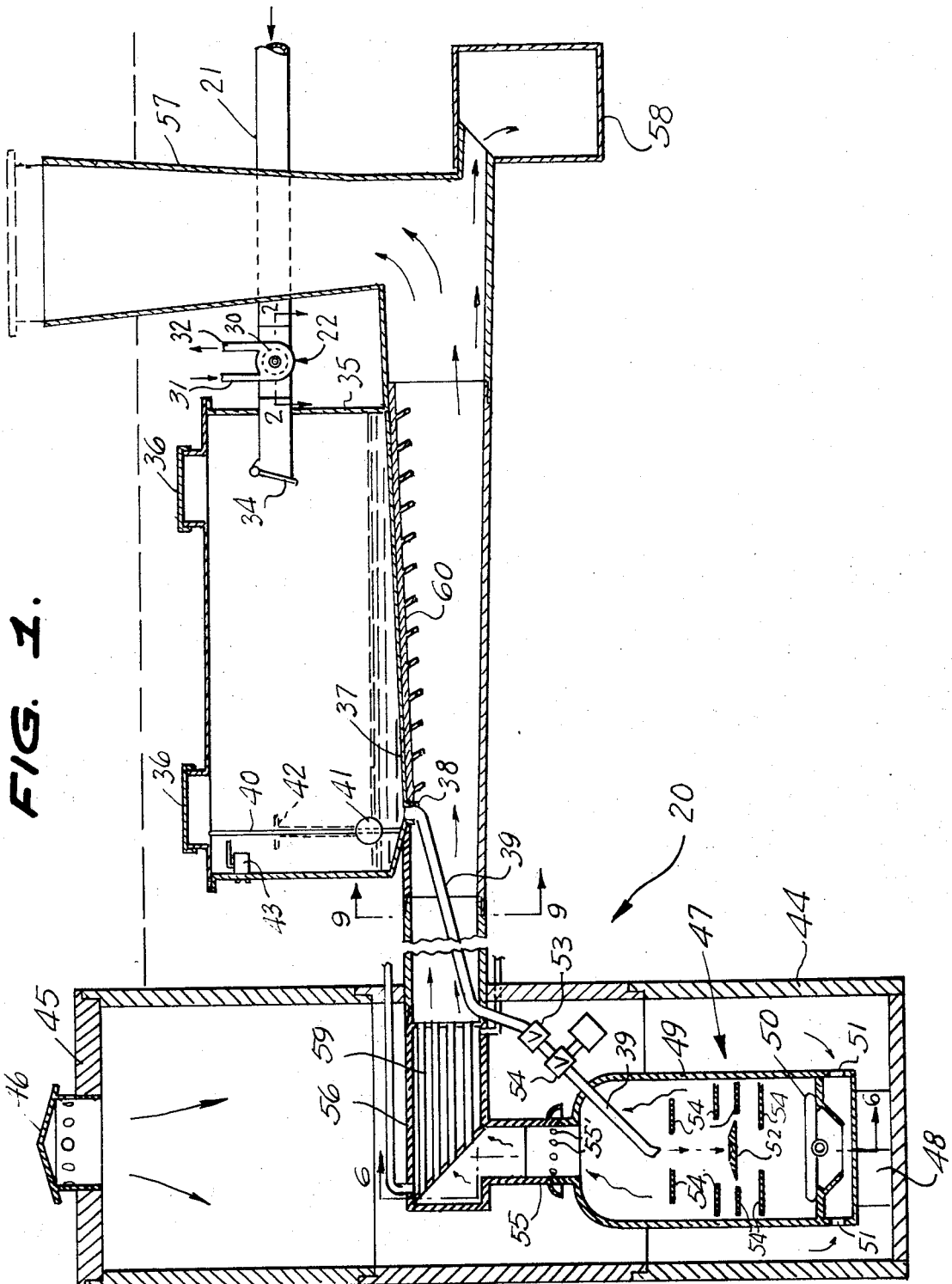

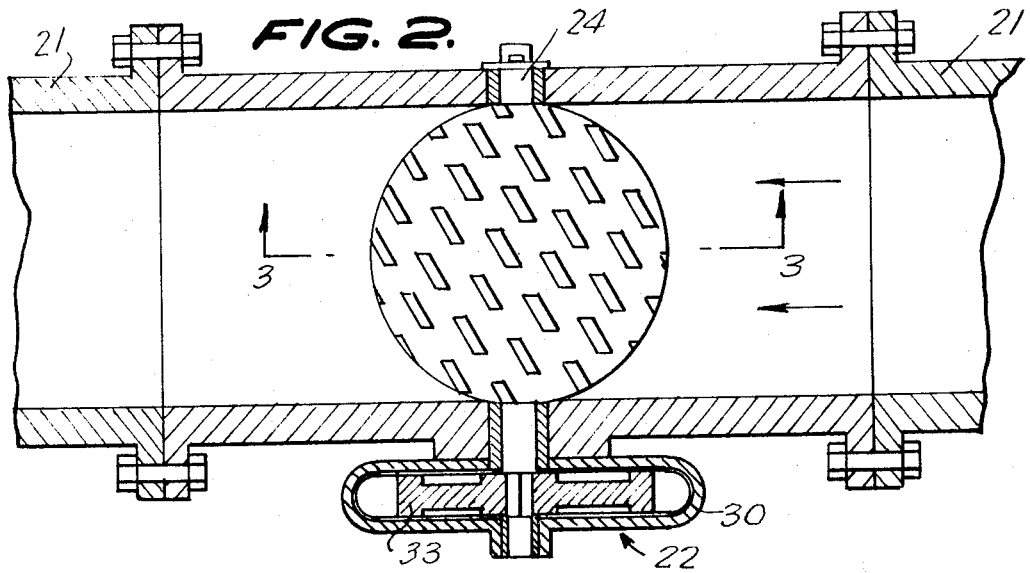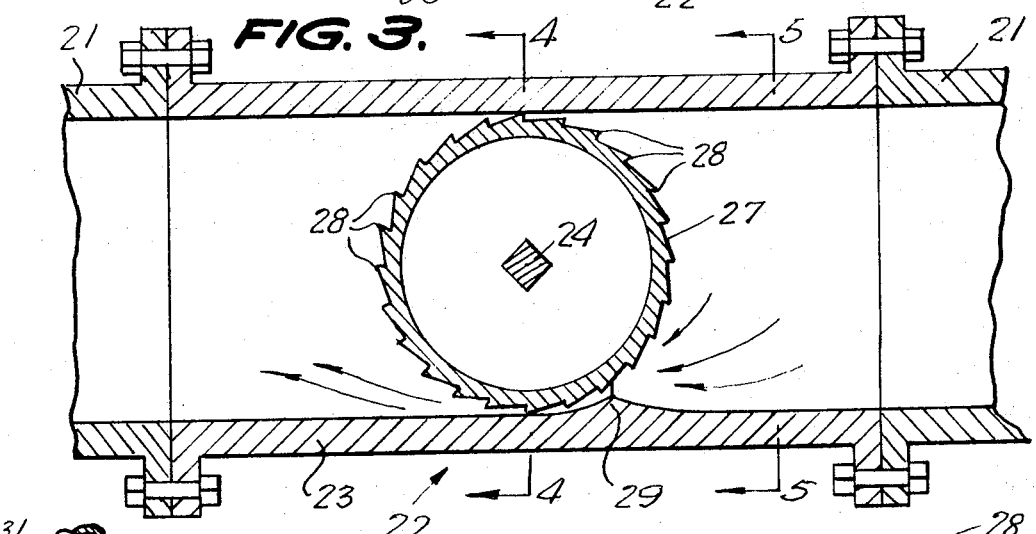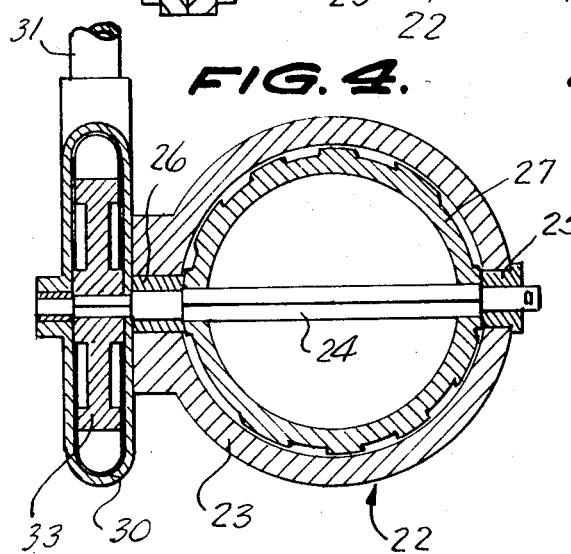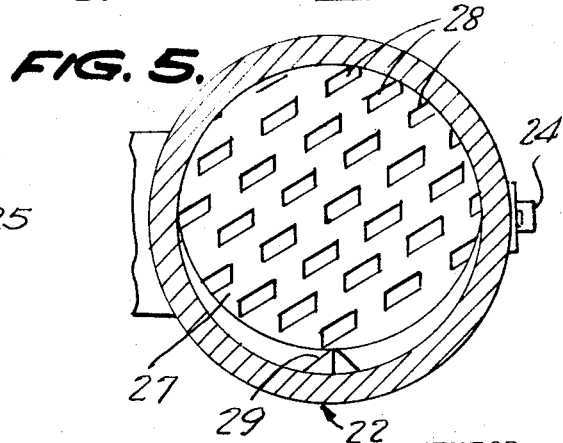

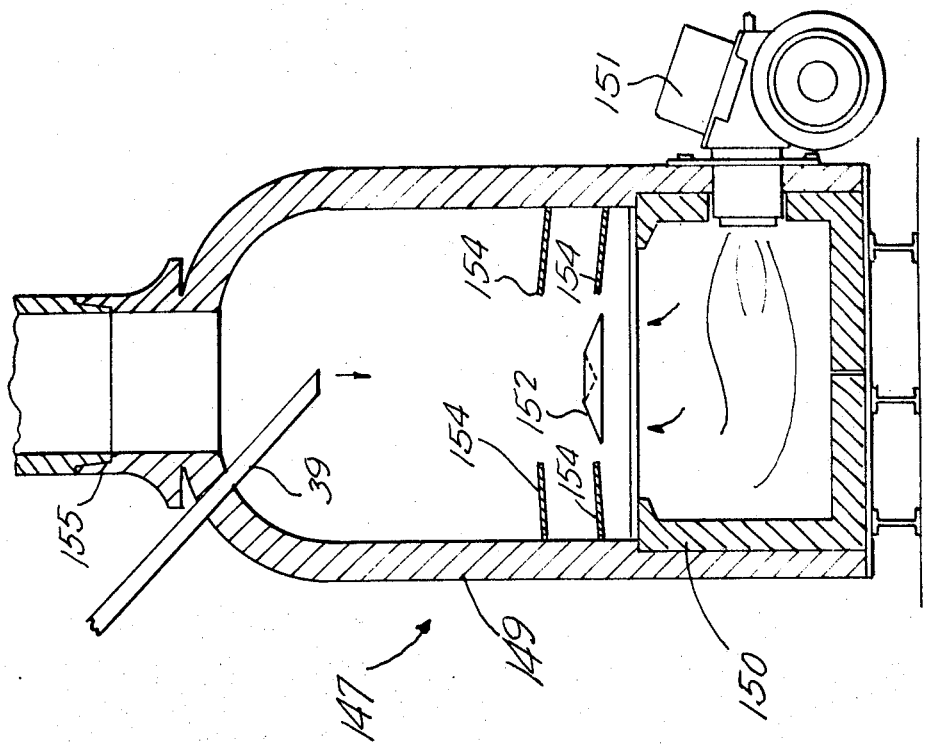
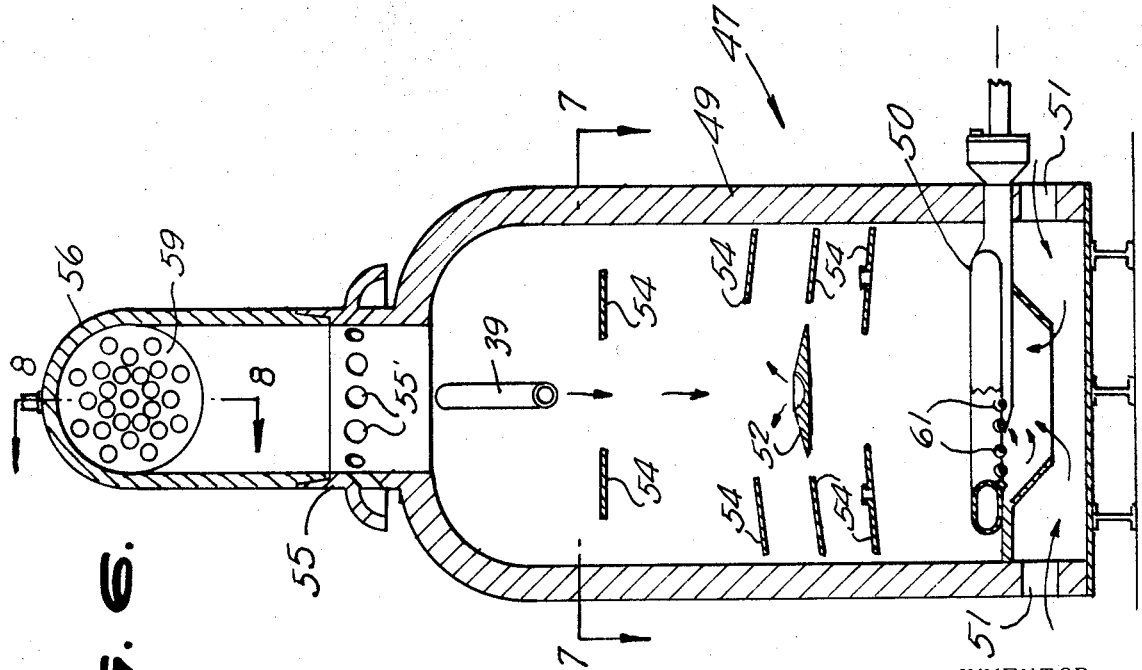

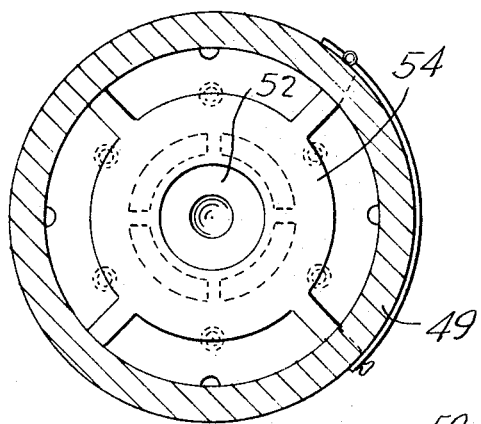
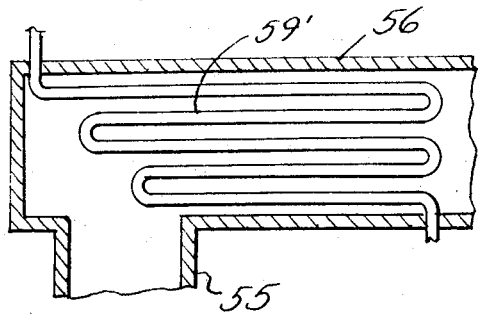
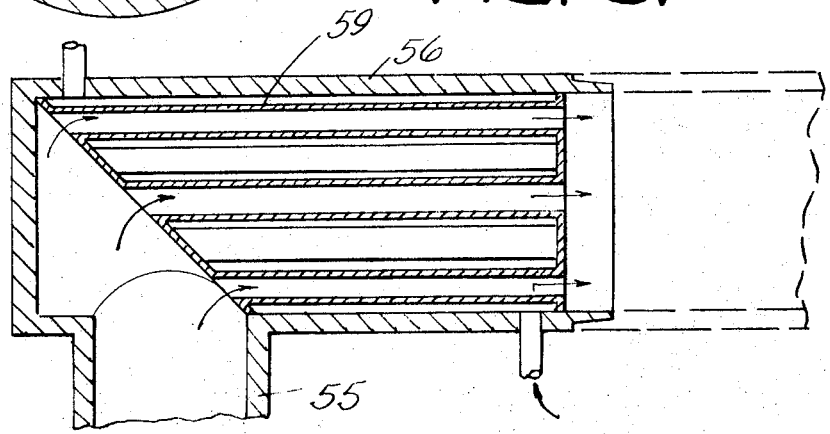
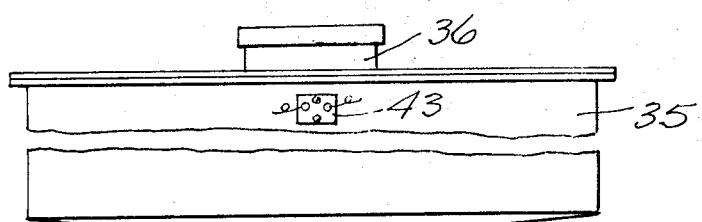
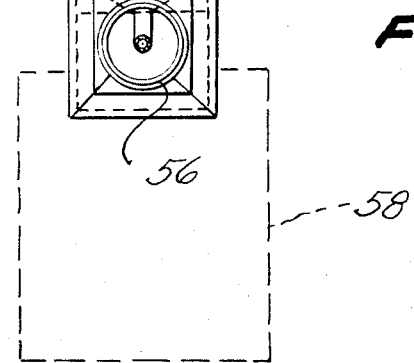

THERMOLYTIC SEWAGE SYSTEM

BACKGROUND OF THE INVENTION

Field of the Invention

The present invention relates to the thermal treatment of sewage in which the sewage is burned to a fine ash and the products of combustion are utilized to heat domestic hot water as well as preheat the sewage in a holding tank.

SUMMARY OF THE INVENTION

Sewage flowing from a building passes through a spherical grinder to reduce and disperse the solids through the liquid. The sewage then passes into a holding tank and from there to an evaporator. The products of combustion from the evaporator heat domestic hot water as well as preheat the tank with condensate from the products of combustion passing to a second holding tank and from there into the ground. The gaseous products of combustion flow upwardly through a stack to the air.

The primary object of the invention is to provide a system for treating sewage which eliminates both ground and air pollution while reducing the sewage to a fine ash and completely burn gaseous components.

Other objects and advantages will become apparent from the following specification when considered in the light of the attached drawings.

BRIEF DESCRIPTION OF THE DRAWINGS

FIG. 1 is a vertical sectional view illustrating the complete system of the present invention;

FIG. 2 is an enlarged fragmentary horizontal sectional view along the line 2—2 of FIG. 1, looking in the direction of the arrows;

FIG. 3 is a fragmentary vertical cross-section taken along the line 3—3 of FIG. 2, looking in the direction of the arrows;

FIG. 4 is a transverse vertical cross-section taken along the ine 4—4 of FIG. 3, looking in the direction of the arrows;

FIG. 5 is a transverse vertical cross-section taken along the line 5—5 of FIG. 3, looking in the direction of the arrows;

FIG. 6 is an enlarged fragmentary vertical cross-section taken along the line 6—6 of FIG. 1, looking in the direction of the arrows;

FIG. 7 is a horizontal sectional view taken along the line 7—7 of FIG. 6, looking in the direction of the arrows;

FIG. 8 is an enlarged fragmentary vertical cross-section taken along the line 8—8 of FIG. 6, looking in the direction of the arrows;

FIG. 9 is a transverse cross-section taken along the line 9—9 of FIG. 1, looking in the direction of the arrows;

FIG. 10 is a view similar to FIG. 8 of a modified form of the invention; and

FIG. 11 is a view similar to FIG. 6 of another modified form of the invention.

DESCRIPTION OF THE PREFERRED EMBODIMENTS

Referring now to the drawings in detail wherein like reference characters indicate like parts throughout the several figures, the reference numeral 20 indicates generally a system for treating sewage constructed in accordance with the invention.

The system 20 includes a sewer pipe 21 flowing from a building or otehr source of sewage. The pipe 21 has a grinder indicated generally at 22 incorporated therein. The grinder 22 includes a generally cylindrical pipe section 23 having a shaft 24 extending thereacross and journaled in bushings 25, 26 at opposite ends thereof. A substantially spherical grinding ball 27 is housed on the shaft 24 within the pipe section 23 and has a plurality of teeth 28 formed on its outer surface. The pipe section 23 has a portion 29 on its inner face which is shaped to cooperate with the spherical grinder 27 to assist in comminuting the sewage. A housing 30 is secured to the pipe section 23 and has a water inlet pipe 31 and a water outlet pipe 32 communicating therewith. A water wheel 33 is mounted in the housing 30 and is fixed to the shaft 24 so that as water flows through the inlet pipe 31 and out the outlet pipe 32, the water wheel 33 is rotated and the grinding sphere 27 is rotated within the pipe section 23.

A check valve 34 is secured to the outlet end of the pipe 21 permitting the flow of sewage therefrom and preventing the back flow of material into the pipe 21.

An underground holding tank 35 is provided with a pair of inspection hatches 36 and the pipe 21 extends therein so that the sewage is collected in the holding tank 35. The bottom 37 of the holding tank 35 is sloped to an outlet fitting 38 to which is attached an outlet pipe 39 sloping downwardly and outwardly therefrom.

A vertical shaft 40 in the holding tank 35 has a ball float 41 mounted for rotatable reciprocation thereon and carrying a switch actuator 42. An electric switch 43 is mounted in the tank 35 in a position to be engaged by the switch actuator 42 when raised into contact by the float 41.

A dry well 44 is positioned in the ground adjacent the holding tank 35 and terminates in an above ground cover 45 having a vent cupola 46 mounted thereon. An evaporator generally indicated at 47 is positioned within the dry well 44 and supported on a base 48. The evaporator 47 is a generally cylindrical hollow chamber 49 having a gas heating unit 50 supported in the lower end thereof. Air and light openings 51 are formed in the side of the chamber 49 below the gas heating unit 50 to admit air thereto. A splash plate 52 is supported centrally of the chamber 49 above the gas plate 50 to receive the discharge from a conduit 39 extending from the holding tank 35. A hand actuated valve 53 is provided for closing the conduit 39 and an electrically operated valve 54 is provided for controlling the flow of fluid through the conduit 39 in response to the temperature in the chamber 49.

A plurality of baffles 54 are provided in the chamber 49 to receive the splash from the splash plate 52. The baffles 54 are arranged so that fluid from the conduit 39 cannot fall directly on the gas burner 50. A stack 55 extends upwardly from the chamber 49 and has a plurality of additional air inlet openings 56 extending therein.

A conduit 56 extends generally horizontally from the top of the stack 55 underneath the holding tank 35 to a vent stack 57.

The conduit 56 flows outwardly at its downstream end with its bottom wall sloping to a holding tank 58 to receive condensate which would otherwise collect in the conduit 56.

A fire tube domestic water heater 59 is positioned in the conduit 56 for heating domestic hot water when desired. A heat conducting fin unit 60 forms a part of the conduit 56 underneath the holding tank 35 to assist in transferring heat from the products of combustion in the conduit 56 to the fluids in the holding tank 35.

In FIG. 10 a modified form of the invention is illustrated wherein a hot water coil 59' is mounted in the conduit 56 in place of the heat exchanger 59.

A modified evaporator is indicated generally at 147 in FIG. 11. The evaporator 147 has a generally cylindrical chamber 149 with a ceramic fire box 150 positioned in the lower end thereof. A conventional oil burner 151 extends into the chamber 149 and into the fire box 150 in a conventional manner.

A splash plate 152 is mounted in the chamber 149 to receive a flow from the conduit 39, as illustrated in the preferred form of the invention. A stack 155 extends upwardly from the chamber 149 to the conduit 56.

In the use and operation of the invention, sewage flows through the sewer pipe 21 and is comminuted by the grinder 22 prior to flowing past the check valve 34 into the holding tank 35. The liquid sewage is preheated in the holding tank 35 by the products of combustion flowing through the conduit 56 in contact with the fin plate 60. As the sewage level rises in the holding tank 35, the float ball 41 through the actuator 42 closes the switch 43 to cause the gas burner 50 to start operation. When the heat in the chamber 49 has risen to the desired point, the valve 54 will be automatically opened to begin a flow of sewage to the evaporator 47. The sewage flows through the conduit 39 and strikes the splash plate 52, splashing on to the baffles 54 and being very finely divided. Heat from the gas burner 50 evaporates the fluids on the baffles 54 and in the evaporator 47 as well as completely burning the solids therein to a fine ash. The products of combustion with the exception of the ash, flow upwardly through the stack 55 and heat the domestic water for the home in the heat exchanger 59. The products of combustion then contact the fin plate 60 to warm the sewage in the holding tank 35 before passing upwardly through a vent stack 57. Liquids condensing from the products of combustion gases flow downwardly to the holding tank 58 from which they can be pumped as required. It should be understood that in place of the holding tank 58 the condensate may be fed directly into the ground.

The grinder 22 is illustrated as being operated by water pressure, however, it should be understood that an electric motor may also be used for this purpose when desired or required.

The operation of the hot water coil 59' is identical to that of the heat exchanger 59.

The operation of the evaporator 147, with the exception of the particular source of heat, operates in the same manner as the evaporator 47.

It should be noted in the evaporator 47 that at least a portion of the jets 61 in the gas burner 50 are directed downwardly at a substantial angle to prevent the gas burner 50 from flaming out due to an excess of fluid flowing through the pipe 39. In the event that the evaporator 47 cools due to an excess flow of sewage through the conduit 39, the valve 54 will throttle or close the conduit 39.

Having thus described the preferred embodiments of the invention, it should be understood that numerous structural modifications and adaptations in addition to those disclosed may be resorted to without departing from the spirit of the invention.

What is claimed is:

1. A sewage treatment plant comprising a sewage holding tank, a sewer pipe extending into said tank, means in said sewer pipe for comminuting sewage passing through said sewer pipe to said holding tank, a dry well positioned adjacent said holding tank and having a depth substantially greater than said holding tank, an evaporator mounted in said dry well adjacent the bottom thereof, means for gravity feeding sewage from said holding tank to said evaporator, means in said evaporator for spreading the sewage flowing from said holding tank, a heater mounted in the bottom of said evaporator for heating the sewage flowing into said evaporator from said holding tank, and a conduit extending from said evaporator in heat exchange relation with said holding tank for preheating the sewage in said holding tank prior to delivery to said evaporator.

2. A device as claimed in claim 1, wherein said grinder comprises a generally spherical rotary grinding member and water actuated means for rotating said grinding member.

3. A device as claimed in claim 1, wherein means is provided in said holding tank actuated by the height of sewage in said tank for energizing the burner in said evaporator.

4. A device as claimed in claim 1, wherein a motor actuated valve is mounted in the means for feeding sewage from said holding tank to said evaporator with said valve being controlled in response to the temperature in said evaporator.

5. A device as claimed in claim 1, wherein the means for spreading the sewage in said evaporator comprises a splash plate positioned centrally of said evaporator and a plurality of baffles positioned therearound to receive the splash from said splash plate.

6. A device as claimed in claim 1, wherein a heat exchanger is provided in the conduit means extending from said evaporator for heating domestic water.

7. A device as claimed in claim 1, wherein means are provided in said conduit means extending from said evaporator for collecting condensate resulting from the products of combustion.

8. A device as claimed in claim 1, wherein a vent stack communicates with the conduit means extending from said evaporator to vent said conduit means to the atmosphere.

9. A device as claimed in claim 1, wherein a vent cap is mounted on said dry well for admitting atmospheric air to said dry well for use by said evaporator.

10. A device as claimed in claim 1, wherein a stack extends upwardly from said evaporator and a plurality of additional air vents extend into said stack to admit extra air to said stack as required.

* * * * *